(12) United States Patent
Tashiro et al.

(10) Patent No.: US 10,882,482 B2
(45) Date of Patent: Jan. 5, 2021

(54) IMPACT ABSORPTION STRUCTURE FOR VEHICLES

(71) Applicant: MAZDA MOTOR CORPORATION, Hiroshima (JP)

(72) Inventors: Kuniyoshi Tashiro, Hiroshima (JP); Ippei Kuroda, Hiroshima (JP); Satoshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/348,079

(22) PCT Filed: Oct. 11, 2017

(86) PCT No.: PCT/JP2017/036853
§ 371 (c)(1),
(2) Date: May 7, 2019

(87) PCT Pub. No.: WO2018/088099
PCT Pub. Date: May 17, 2018

(65) Prior Publication Data
US 2019/0256022 A1  Aug. 22, 2019

(30) Foreign Application Priority Data

Nov. 8, 2016  (JP) .................... 2016-217958

(51) Int. Cl.
| | |
|---|---|
| *B60R 19/34* | (2006.01) |
| *B60R 19/02* | (2006.01) |
| *B60R 19/04* | (2006.01) |
| *B60R 19/18* | (2006.01) |
| *B60R 19/24* | (2006.01) |
| *B60R 21/00* | (2006.01) |

(52) U.S. Cl.
CPC ............ *B60R 19/34* (2013.01); *B60R 19/023* (2013.01); *B60R 19/04* (2013.01); *B60R 19/18* (2013.01); *B60R 19/24* (2013.01); *B60R 2021/0004* (2013.01)

(58) Field of Classification Search
CPC ....... B60R 19/34; B60R 19/023; B60R 19/04; B60R 19/18; B60R 19/24
USPC .................................................. 293/132, 133
See application file for complete search history.

(56) References Cited

U.S. PATENT DOCUMENTS 6,174,009 B1 * 1/2001 McKeon ................. B60R 19/34
                                                                188/377
7,389,860 B2   6/2008 Abu-Odeh et al.
9,205,793 B2 * 12/2015 Iijima ..................... B60R 19/24
(Continued)

FOREIGN PATENT DOCUMENTS

EP         1477371 A2    11/2004
JP      2013-095346 A     5/2013
(Continued)

OTHER PUBLICATIONS

International Search Report issued in PCT/JP2017/036853; dated Nov. 7, 2017.

*Primary Examiner* — Joseph D. Pape
(74) *Attorney, Agent, or Firm* — Studebaker & Brackett PC

(57) ABSTRACT

The inner side of the crush can 4 in the vehicle width direction extends forward relative to the outer side. The inner side of the crush can 4 in the vehicle width direction is formed with the cutout portions 70 to 73 by cutting off a part of a material.

4 Claims, 9 Drawing Sheets

(56) References Cited

U.S. PATENT DOCUMENTS

| | | | |
|---|---|---|---|
| 9,403,498 B2 * | 8/2016 | Hoschouer | B60R 19/34 |
| 2006/0237976 A1 * | 10/2006 | Glasgow | B21C 37/158 |
| | | | 293/132 |
| 2013/0113224 A1 | 5/2013 | Tsuchida et al. | |
| 2014/0062107 A1 * | 3/2014 | Kim | B60R 19/34 |
| | | | 293/133 |
| 2015/0061307 A1 | 3/2015 | Nakanishi | |
| 2017/0151919 A1 | 6/2017 | Kashiwagi et al. | |

FOREIGN PATENT DOCUMENTS

| | | |
|---|---|---|
| JP | 2013-216169 A | 10/2013 |
| JP | 2014-113894 A | 6/2014 |
| JP | 2015-155704 A | 8/2015 |
| JP | 2017-100555 A | 6/2017 |
| WO | 2012/147179 A1 | 11/2012 |

* cited by examiner

IMPACT ABSORPTION STRUCTURE FOR VEHICLES

TECHNICAL FIELD

The present disclosure relates to an impact absorption structure provided in a vehicle, and more particularly, belongs to a technical field of a structure of absorbing energy by crushing deformation in a vehicle front and rear direction when an impact load is applied from the vehicle front and rear direction.

BACKGROUND ART

In general, on the front part of an automobile, front side frames are disposed on both right and left sides of the front part to extend in a front and rear direction of the automobile. Crush cans are attached to the front end portions of these front side frames so as to absorb energy by crushing deformation in the front and rear direction when an impact load is applied from the front of the automobile. Moreover, a bumper beam is attached to the front end portions of the right and left crush cans so as to extend in a width direction of the automobile (for example, see PATENT DOCUMENTS 1 and 2). In PATENT DOCUMENTs 1 and 2, a plurality of beads are formed on an inner side of the crush can in the width direction of the automobile so as to extend in a vertical direction while being spaced apart from each other in the front and rear direction.

Furthermore, PATENT DOCUMENT 3 discloses a shock absorption mechanism including a polygonal cylindrical member, and cuts are formed at corners of a front end portion of the cylindrical member along a ridge line portion.

CITATION LIST

Patent Document

PATENT DOCUMENT 1: Japanese Unexamined Patent Publication No. 2013-95346
PATENT DOCUMENT 2: Japanese Unexamined Patent Publication No. 2014-113894
PATENT DOCUMENT 3: Japanese Unexamined Patent Publication No. 2015-155704

SUMMARY OF THE INVENTION

Technical Problem

For example, some bumper beams, such as the ones in PATENT DOCUMENTS 1 and 2, employ a shape in which the bumper beams are curved or inclined so as to be positioned in a plan view closer to a rear of the vehicle as the bumper beam extends outward in the vehicle width direction due to vehicle design. In such a case, since a crush can is provided on each side in the vehicle width direction, both sides of the bumper beam in the vehicle width direction, that is, just the curved or inclined portions are attached to the front end portion of the crush can. Therefore, the dimension in the front and rear direction of an inner side of the crush can in the vehicle width direction is larger than that in the front and rear direction of an outer side. In other words, an inner wall part of the crush can in the vehicle width direction becomes longer than an outer wall part in the front and rear direction.

The crush can is provided for reducing deformation of the front side frame by absorbing collision energy at the time of a light collision when a vehicle collides with an obstacle at a vehicle speed of, for example, 15 km/h or lower. However, as described above, when the curved or inclined portions of the bumper beam are attached to the front end portion of the crush can, if a load at the time of the light collision is applied to, for example, an intermediate portion of the bumper beam in the vehicle width direction, since the inner wall part of the crush can in the vehicle width direction is longer than the outer wall part in the front and rear direction, a large load is easily transmitted to an inner side of the front side frame in the vehicle width direction via the inner wall part of the crush can at an initial stage at which the crush can begins to be deformed and thus the inner side of the front side frame in the vehicle width direction may be deformed.

On the other hand, in PATENT DOCUMENTS 1 and 2, the bead is formed on the inner wall part of the crush can in the vehicle width direction, but since the bead is formed by partially bending and deforming a material, the material remains and it may be difficult to deform the inner wall part of the crush can in the vehicle width direction as desired at the initial stage of the beginning of deformation. Furthermore, it is preferable to reduce a dimension of the crush can in the front and rear direction as much as possible after the deformation of the crush can, but in the bead formation as in PATENT DOCUMENTs 1 and 2, since the material remains, it is difficult to shorten the dimension in the front and rear direction after the deformation.

Furthermore, in recent years, since there is an increasing demand for weight reduction of vehicles, weight reduction of the crush can particularly located at the front overhang is important because it has an influence on handling performance of the vehicles. In this point, the case of the bead formation as in PATENT DOCUMENTS 1 and 2 does not contribute to weight reduction because the material remains.

Furthermore, in PATENT DOCUMENT 3, a portion, of the bumper beam, extending linearly in the vehicle width direction is attached to a front end portion of the cylindrical member, the aforementioned problem does not occur, preventing the risk that a large load is easily transmitted to the inner side of the front side frame in the vehicle width direction via the inner wall part of the crush can at the initial stage at which the crush can begins to be deformed.

The present invention has been made to solve the aforementioned problems, and an object of the present invention is to reduce deformation of a front side frame by improving energy absorption performance of a crush can while reducing a weight of the crush can when a bumper beam having a curved or inclined portion in a plan view is attached to the crush can.

Solution to the Problem

In order to achieve the aforementioned object, in the present invention, a cutout portion is formed on an inner side of a crush can in a vehicle width direction by cutting off a part of a material.

A first invention is directed to an impact absorption structure for a vehicle in which crush cans are respectively attached to vehicle front end portions of front side frames each disposed on one of a right side and a left side of the vehicle and extending in a vehicle front and rear direction, and a bumper beam is attached to vehicle front end portions of the right and left crush cans to extend in a vehicle width direction, wherein the bumper beam is formed to be curved or inclined to be positioned in a plan view closer to a rear of the vehicle as the bumper beam extends outward in the vehicle width direction, and portions of the bumper beam curved or inclined are attached to the vehicle front end portions of the crush cans, and an inner side of each of the crush cans in the vehicle width direction is formed with a cutout portion by cutting off a part of a material of the crush can.

According to such a configuration, when a load at the time of a light collision is applied to, for example, an intermediate portion of the bumper beam in the vehicle width direction, since the curved or inclined portion of the bumper beam is attached to the vehicle front end portion of the crush can, the load is applied earlier to the inner side of the crush can than to the outer side at the initial stage of the beginning of deformation. When the load is applied, since the inner side of the crush can is formed with the cutout portions and is weakened due to the removal of a part of the material, the inner side of the crush can is easily deformed and thus the deformation of the inner side of the crush can is induced as desired. Such features keep a large load from being transmitted to the inner side of the front side frame in the vehicle width direction, the deformation of the inner side of the front side frame in the vehicle width direction is reduced.

Furthermore, since a part of the material of the inner side of the crush can is removed, a weight of the crush can is reduced by the removed amount and the dimension of the crush can in the front and rear direction after the deformation is particularly reduced inward in the vehicle width direction, so that impact absorption performance is improved.

In a second invention, the crush can includes an upper wall part and a lower wall part extending in the vehicle width direction while being separated from each other in the vertical direction, an inner wall part extending in the vertical direction to connect inner end portions of the upper wall part and the lower wall part in the vehicle width direction to each other, and an outer wall part extending in the vertical direction to connect outer end portions of the upper wall part and the lower wall part in the vehicle width direction to each other, and at least one of a ridge line portion configured by the upper wall part and the inner wall part of the crush can and a ridge line portion configured by the lower wall part and the inner wall part of the crush can is provided with the cutout portion.

That is, the ridge line portion configured by the upper wall part and the inner wall part of the crush can and the ridge line portion configured by the lower wall part and the inner wall part of the crush can are high strength portions against a compressive load as compared with a flat portion, but the cutout portion is formed in the high strength portions, so that the ridge line portions do not serve as props between the bumper beam and the front side frame at the time of a light collision and the deformation of the inner side of the crush can in the vehicle width direction is reliably induced.

In the third invention, the crush can is provided therein with a horizontal wall part extending from the inner wall part to the outer wall part, and the cutout portion is formed in a portion of the inner wall part where the horizontal wall part is continuous.

According to such a configuration, the horizontal wall part is provided inside the crush can, so that support stiffness of the bumper beam is increased and an energy absorption amount is increased. A portion of the inner wall part of the crush can, which is connected to the horizontal wall part, is cut off, so that the inner wall part and the horizontal wall part are partially disconnected from each other. In this way, the deformation of the inner wall part of the crush can at the time of a light collision is less likely to be inhibited by the horizontal wall part, so that the deformation of the inner wall part is reliably induced.

In the fourth invention, the cutout portion is provided continuously to an inner end portion of the horizontal wall part in the vehicle width direction.

According to such a configuration, since a part of the inner end portion of the horizontal wall part in the vehicle width direction is cut off, the inner end portion of the horizontal wall part in the vehicle width direction does not serve as a prop between the bumper beam and the front side frame and the deformation of the inner side of the crush can in the vehicle width direction is reliably induced.

In the fifth invention, the cutout portion is provided at a vehicle front part of the crush can.

According to such a configuration, since the cutout portion is located on the inner side of the crush can in the vehicle width direction and at the vehicle front part, the front part of the inner side of the crush can in the vehicle width direction begins to be crushed and deformed and then the other portions begin to be crushed and deformed. In this way, the inner side and outer side of the crush can in the vehicle width direction are crushed at the same timing.

Advantages of the Invention

According to the first invention, since the cutout portion is formed on the inner side of the crush can in the vehicle width direction by cutting off a part of the material, energy absorption performance of the crush can is improved while reducing the weight of the crush can, so that it is possible to suppress the deformation of the front side frame.

According to the second invention, at least one of the ridge line portion configured by the upper wall part and the inner wall part of the crush can and the ridge line portion configured by the lower wall part and the inner wall part of the crush can is formed with the cutout portion, so that it is possible to reliably induce the deformation of the inner side of the crush can in the vehicle width direction at the time of a light collision.

According to the third invention, the horizontal wall part is provided inside the crush can, so that it is possible to increase support stiffness of the bumper beam and to increase an energy absorption amount of the crush can. In such a case, it is possible to partially insulate the horizontal wall part and the inner wall part of the crush can from each other by the cutout portion, so that it is possible to reliably deform the inner wall part of the crush can at the time of a light collision.

According to the fourth invention, the cutout portion is continuous to the inner end portion of the horizontal wall part of the crush can in the vehicle width direction, so that it is possible to reliably deform the inner side of the crush can in the vehicle width direction at the time of a light collision.

According to the fifth invention, the cutout portion can be formed on the inner side of the crush can in the vehicle width direction and at the vehicle front part, so that it is possible to crush the inner side and outer side of the crush can in the vehicle width direction at the same timing and to absorb energy by using the entire crush can.

DESCRIPTION OF EMBODIMENTS

Hereinafter, an embodiment of the present invention will be described in detail with reference to the drawings. The following description of a preferred embodiment is merely exemplary and is not intended to limit the present invention, applications thereof, or usages thereof.

Figure 1:
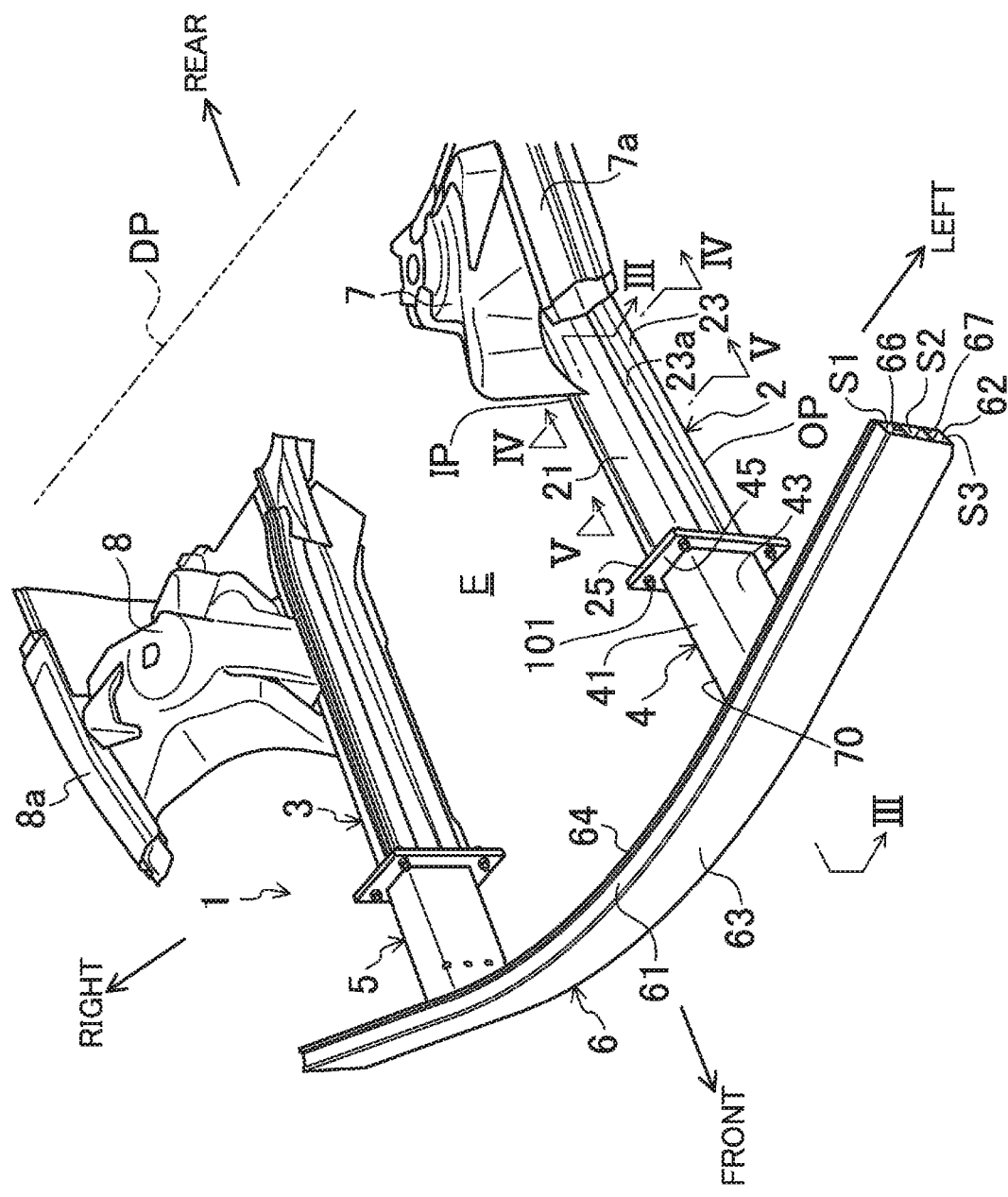
FIG. 1 is a perspective view when an impact absorption structure for a vehicle according to an embodiment of the present invention is viewed from the upper left.

FIG. 1 is a perspective view when an impact absorption structure 1 of a vehicle according to an embodiment of the present invention is viewed from an obliquely upper left. The impact absorption structure 1, for example, is provided at the front part of a passenger vehicle, and includes a left front side frame 2, a right front side frame 3, a left crush can 4, a right crush can 5, and a bumper beam 6 extending in a vehicle width direction. The left crush can 4 and the right crush can 5 are attached to the front end portions of the left front side frame 2 and the right front side frame 3, respectively. The bumper beam 6 is attached to the front end portions of the left crush can 4 and the right crush can 5. In the embodiment, it is assumed that the front side of the vehicle is simply referred to as "front", the rear side of the vehicle is simply referred to as "rear", the left side of the vehicle is simply referred to as "left", and the right side of the vehicle is simply referred to as "right".

The left front side frame 2 and the right front side frame 3 are disposed on the left side and right side of a vehicle body, respectively, and extend in a front and rear direction while being separated from each other in a right and left direction. Between the left front side frame 2 and the right front side frame 3, an engine, a transmission and the like (not illustrated) are disposed. Furthermore, the vehicle is provided with a dash panel DP (its schematic shape is indicated by a virtual line) that divides an engine compartment E and a passenger compartment (not illustrated). The dash panel DP extends approximately vertically. The left front side frame 2 extends to the front from the vicinity of the left side of the dash panel DP, and the right front side frame 3 extends to the front from the vicinity of the right side of the dash panel DP.

The front part of the vehicle is provided with a left suspension tower 7 formed in a tower shape on a left side of the left front side frame 2 and a right suspension tower 8 formed in a tower shape on a right side of the right front side frame 3. The sides of the left suspension tower 7 and the right suspension tower 8 are provided with reinforcements 7a and 8a, respectively.

Furthermore, the vehicle is provided with a front bumper, a fender, an engine hood, and the like, but they are not illustrated.

(Configuration of Front Side Frame)

Figure 3:
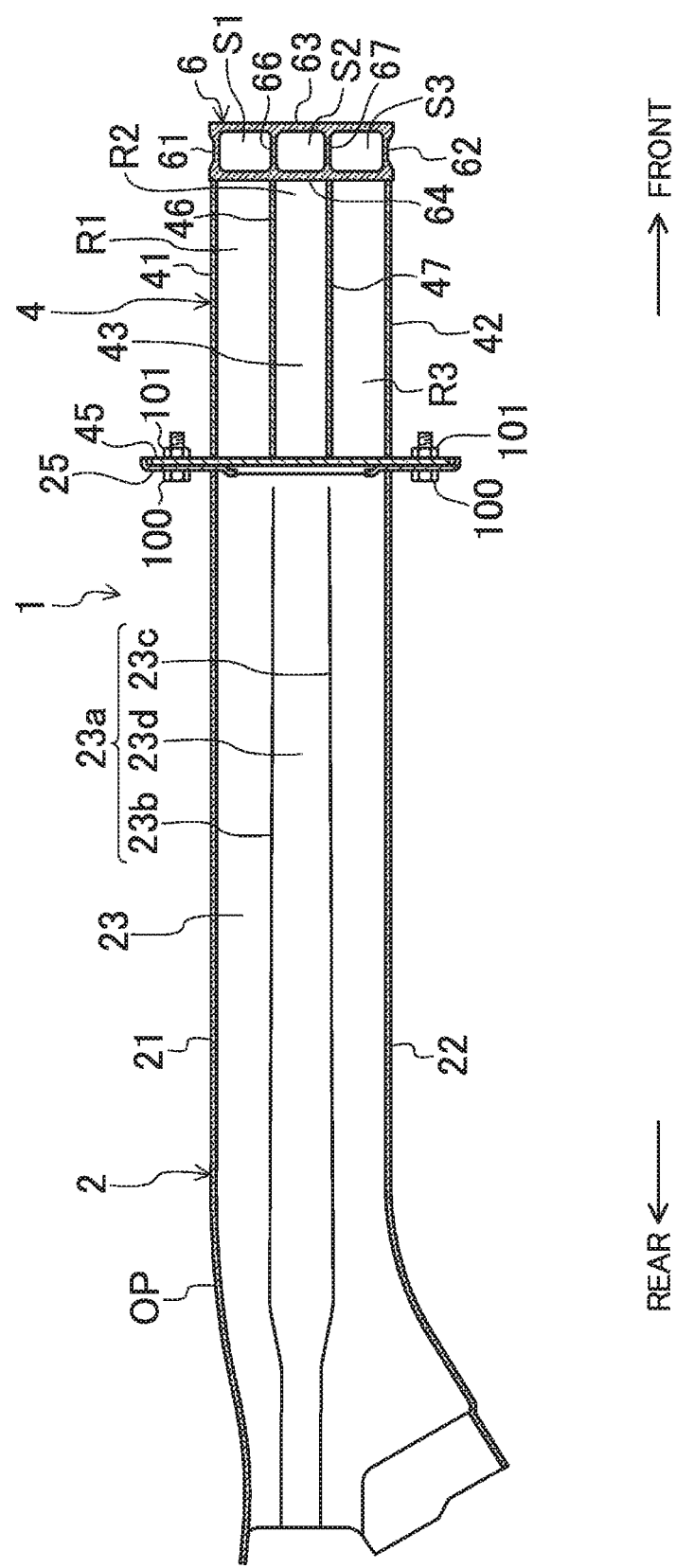
FIG. 3 is a cross-section taken along line III-III in FIG. 1.
Figure 4:
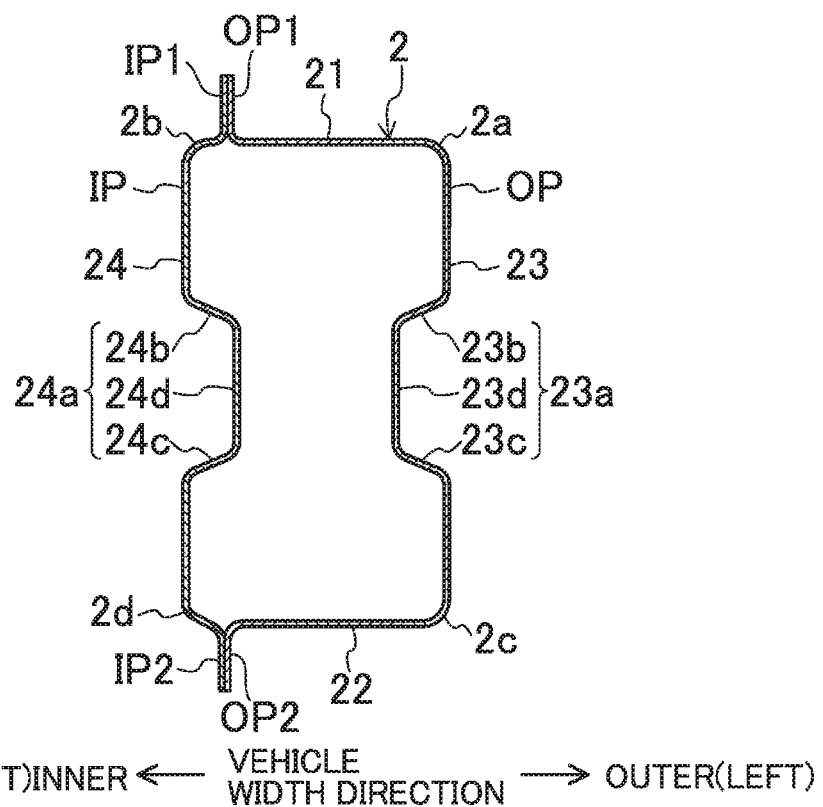
FIG. 4 is a cross-section taken along line IV-IV in FIG. 1.
Figure 5:
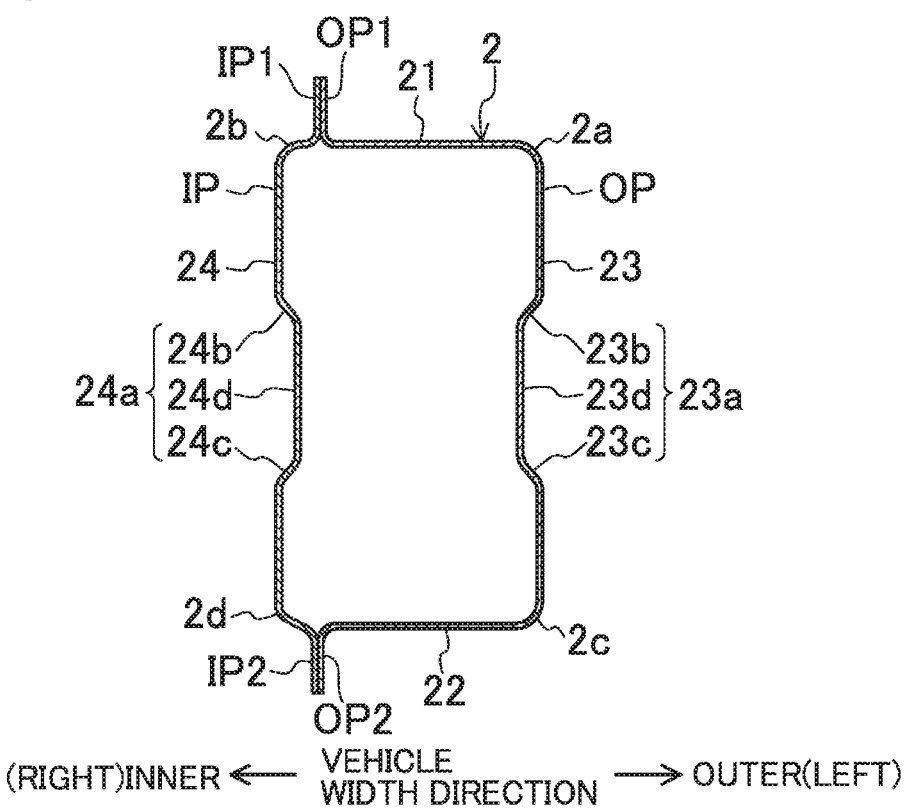
FIG. 5 is a cross-section taken along line V-V in FIG. 1.
Figure 6:
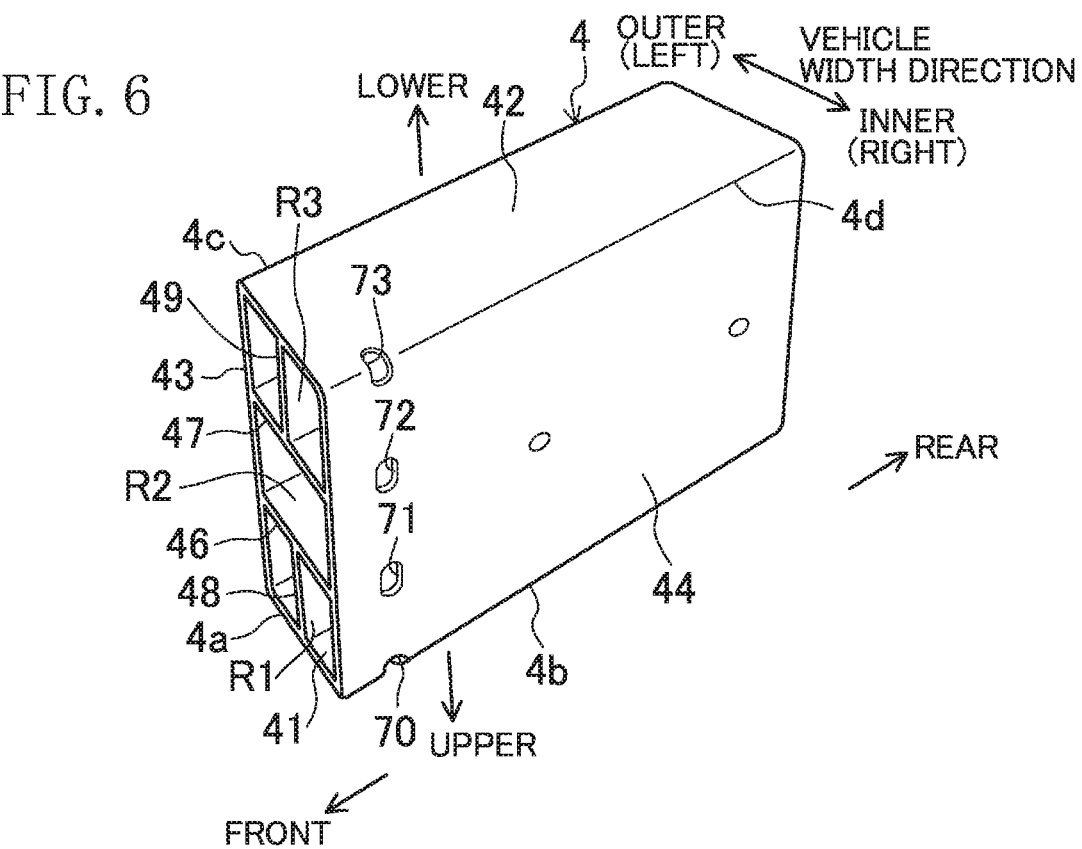
FIG. 6 is a perspective view when a left crush can is viewed from the lower right.

Since the left front side frame 2 and the right front side frame 3 are symmetrical in the right and left direction, the structure of the left front side frame 2 will be described in detail below. As illustrated in FIG. 3 to FIG. 5, the left front side frame 2 has an upper plate part 21 and a lower plate part 22 extending in the right and left direction while being separated from each other in the vertical direction, a left plate part 23 extending in the vertical direction to connect the left end portions of the upper plate part 21 and the lower plate part 22 to each other, and a right plate part 24 extending in the vertical direction to connect the right end portions of the upper plate part 21 and the lower plate part 22 to each other, and has an approximately rectangular sectional shape as a whole. The dimensions of the left plate part 23 and the right plate part 24 in the vertical direction are set to larger than those of the upper plate part 21 and the lower plate part 22 in the right and left direction.

As illustrated in FIG. 3, the upper plate part 21 extends approximately horizontally from the front end portion to the rear end portion of the left front side frame 2. The lower plate part 22 extends from the front end portion to the vicinity of the rear end portion of the left front side frame 2 in approximately parallel to the upper plate part 21, but the vicinity of the rear end portion of the lower plate part 22 is curved and extends to the rear side from the vicinity of the rear end portion of the lower plate part 22 to the rear end portion while being inclined downward. As illustrated in FIG. 4 and FIG. 5, the left plate part 23 constitutes an outer part of the left front side frame 2 in the vehicle width direction, and the right plate part 24 constitutes an inner part of the left front side frame 2 in the vehicle width direction.

The left plate part 23 is provided with an outer recessed linear portion 23a for reinforcement. The outer recessed liner portion 23a is formed in the intermediate portion of the left plate part 23 in the vertical direction, and recessed toward an inner side (right side) of the left front side frame 2 and extending in the front and rear direction. The outer recessed linear portion 23a is recessed toward the inner side of the left front side frame 2, so that it is possible to reinforce the left front side frame 2 without narrowing a lateral space of the left front side frame 2.

The outer recessed linear portion 23a is not formed at a front end portion of the left plate part 23, and extends continuously from a rear portion, other than the front end portion of the left plate part 23, to a rear end portion of the left plate part 23. The depth of the outer recessed linear portion 23a is set shallower toward a front end portion of the outer recessed linear portion 23a and deeper toward a rear end portion of the outer recessed linear portion 23a. The depth of the outer recessed linear portion 23a is a dimension of the outer recessed linear portion 23a in the right and left direction. Furthermore, a dimension of the outer recessed linear portion 23a in the vertical direction is set approximately constant from the front end portion to the rear end portion of the outer recessed linear portion 23a, and in the embodiment, the dimension of the outer recessed linear portion 23a in the vertical direction corresponds to about ⅓ of a dimension of the left front side frame 2 in the vertical direction and is approximately equal to a separation dimension in the vertical direction of an upper horizontal wall part 46 and a lower horizontal wall part 47 of the crush can 4 to be described later.

Although illustrated only in FIG. 4 and FIG. 5, the outer recessed linear portion 23a includes an upper portion 23b and a lower portion 23c projecting to the inner side of the left front side frame 2, and an intermediate plate portion 23d vertically extending from a distal end portion (right end portion) of the upper portion 23b in the projecting direction to a distal end portion (right end portion) of the lower portion 23c in the projecting direction. A separation dimension between the upper portion 23b and the lower portion 23c corresponds to the dimension of the outer recessed linear portion 23a in the vertical direction. The upper portion 23b is inclined to be located lower toward the right end portion. Furthermore, the lower portion 23c is inclined to be located upper toward the right end portion.

The right plate part 24 is provided with an inner recessed linear portion 24a for reinforcement. The inner recessed liner portion 24a is formed in the intermediate portion of the right plate part 24 in the vertical direction, and recessed toward an inner side (left side) of the left front side frame 2 and extending in the front and rear direction. The inner recessed linear portion 24a is not formed at a front end portion of the right plate part 24, and extends continuously from a rear portion, other than the front end portion of the right plate part 24, to a rear end portion of the right plate part 24. That is, since the inner recessed linear portion 24a and the outer recessed linear portion 23a are not formed at the front end portion of the left front side frame 2, the front end portion of the left front side frame 2 has an approximately rectangular cross-section that is long in the vertical direction. In this way, the upper portion of the front end portion of the left front side frame 2 is provided with two ridge line portions 2a and 2b spaced apart from each other in the right and left direction, and the lower portion of the front end portion of the left front side frame 2 is provided with two ridge line portions 2c and 2d spaced apart from each other in the right and left direction. The ridge line portions 2a to 2d are continuous from the front end portion to the rear end portion of the left front side frame 2. The portions where the ridge line portions 2a to 2d are formed have a higher strength than that of a flat plate portion of the left front side frame 2.

The depth of the inner recessed linear portion 24a is set shallower toward a front end portion of the inner recessed linear portion 24a and deeper toward a rear end portion of the inner recessed linear portion 24a. Furthermore, a dimension of the inner recessed linear portion 24a in the vertical direction is set to be the same as the dimension of the outer recessed linear portion 23a in the vertical direction.

Similar to the outer recessed linear portion 23a, the inner recessed linear portion 24a includes an upper portion 24b and a lower portion 24c projecting to the inner side of the left front side frame 2, and an intermediate plate portion 24d extending from a distal end portion (left end portion) of the upper portion 24b in the projecting direction to a distal end portion (left end portion) of the lower portion 24c in the projecting direction. The upper portion 24b is inclined to be located lower toward the left end portion. Furthermore, the lower portion 24c is inclined to be located upper toward the left end portion.

The left front side frame 2 includes an outer panel OP and an inner panel IP joined together. The outer panel OP is disposed on an outer side in the vehicle width direction, and the inner panel IP is disposed on an inner side in the vehicle width direction. The outer panel OP and the inner panel IP, for example, are obtained by press-molding a steel plate and the like. Joining flanges OP1 and OP2 are formed on an upper part and a lower part of the outer panel OP, joining flanges IP1 and IP2 are formed on an upper part and a lower part of the inner panel IP, the joining flange OP1 and the joining flange IP1, for example, are joined together by spot welding, and the joining flange OP2 and the joining flange IP2, for example, are joined together by the spot welding. A joining position of the outer panel OP and the inner panel IP is inside (right side) from the center of the left front side frame 2 in the vehicle width direction.

As illustrated in FIG. 3, a frame-side set plate 25 is fixed to the front end portion of the left front side frame 2 so as to extend in the vertical direction. The frame-side set plate 25 is formed to be larger than the outer shape of the front end portion of the left front side frame 2, and is a member for attaching the crush can 4. Similarly, a frame-side set plate 35 is fixed to the front end portion of the right front side frame 3.

(Configuration of Crush can)

Since the left crush can 4 and the right crush can 5 are symmetrical in the right and left direction, the structure of the left crush can 4 will be described in detail below. As illustrated in FIG. 6 to FIG. 9, the left crush can 4 includes an extrusion molding member having an upper wall part 41 and a lower wall part 42 extending in the right and left direction while being separated from each other in the vertical direction, an outer wall part 43 extending in the vertical direction to connect the left end portions (outer end portions in the vehicle width direction) of the upper wall part 41 and the lower wall part 42 to each other, and an inner wall part 44 extending in the vertical direction to connect the right end portions (inner end portions in the vehicle width direction) of the upper wall part 41 and the lower wall part 42 to each other. The extrusion molding member, for example, is a member molded by extruding a material such as an aluminum alloy and a magnesium alloy from a cap (not illustrated).

The dimensions of the outer wall part 43 and the inner wall part 44 in the vertical direction are set larger than those of the upper wall part 41 and the lower wall part 42 in the right and left direction, and the left crush can 4 has an approximately rectangular sectional shape that is long in the vertical direction as a whole. The dimensions of the upper wall part 41 and the lower wall part 42 of the left crush can 4 in the right and left direction are set approximately equal to those of the upper plate part 21 and the lower plate part 22 of the left front side frame 2 in the right and left direction. Furthermore, the dimensions of the outer wall part 43 and the inner wall part 44 of the left crush can 4 in the vertical direction are set approximately equal to those of the left plate part 23 and the right plate part 24 of the left front side frame 2 in the vertical direction.

The upper portion of the front end portion of the left crush can 4 is provided with two ridge line portions 4a and 4b spaced apart from each other in the right and left direction. The lower portion of the front end portion of the left crush can 4 is provided with two ridge line portions 4c and 4d spaced apart from each other in the right and left direction. The ridge line portions 4a to 4d are continuous from the front end portion to the rear end portion of the left crush can 4.

Furthermore, the rear edges of the upper wall part 41 and the lower wall part 42 of the left crush can 4 extend in the right and left direction. The rear edges of the outer wall part 43 and the inner wall part 44 of the left crush can 4 extend in the vertical direction. In this way, a rear end surface of the left crush can 4 is a surface extending in the vertical direction and the right and left direction, and a crush can-side set plate 45 (illustrated only in FIG. 1 to FIG. 3) is fixed to the rear end surface. The crush can-side set plate 45 and the frame-side set plate 25, for example, are fastened by fastening members such as bolts 100 and nuts 101.

The outer shape of the front end portion of the left front side frame 2 and the outer shape of the rear end portion of the left crush can 4 approximately coincide with each other. In this way, when viewed from the vehicle front and rear direction, the ridge line portions 2a to 2d formed at four portions of the front end portion of the left front side frame 2 and the ridge line portions 4a to 4d formed at four portions of the rear end portion of the left crush can 4 overlap each other, and the front end portions of the upper plate part 21, the lower plate part 22, the left plate part 23, and the right plate part 24 of the left front side frame 2 and the rear end portions of the upper wall part 41, the lower wall part 42, the outer wall part 43, and the inner wall part 44 of the left crush can 4 overlap each other.

As illustrated in FIG. 3, since the set plates 25 and 45 are interposed between the left front side frame 2 and the left crush can 4, the left front side frame 2 and the left crush can 4 do not contact with each other, but when viewed from the vehicle front and rear direction, the front end portions of the plate parts 21 to 24 of the left front side frame 2 and the rear end portions of the wall parts 41 to 44 of the left crush can 4 are in a positional relation so as to overlap each other. Furthermore, when viewed from the vehicle front and rear direction, the front end portions of the plate parts 21 to 24 of the left front side frame 2 and the rear end portions of the wall parts 41 to 44 of the left crush can 4 do not have to completely overlap each other, and a deviation corresponding to a half of the plate thickness is permitted.

Figure 7:
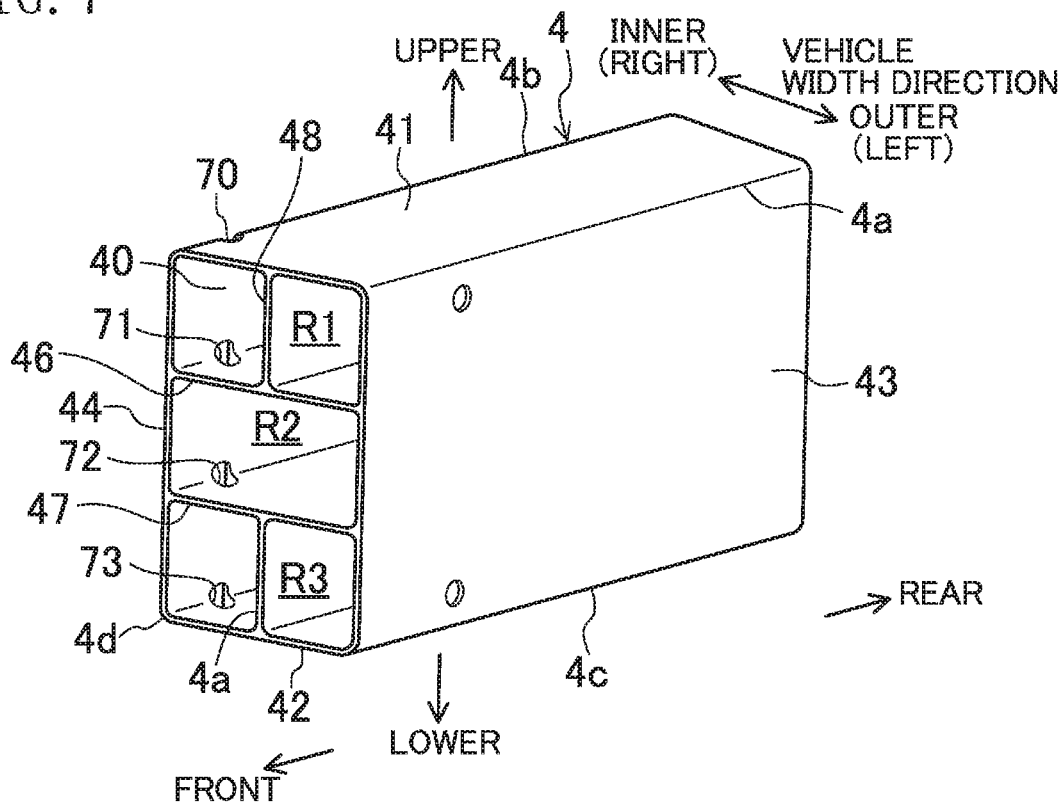
FIG. 7 is a perspective view when the left crush can is viewed from the upper left.
Figure 8:
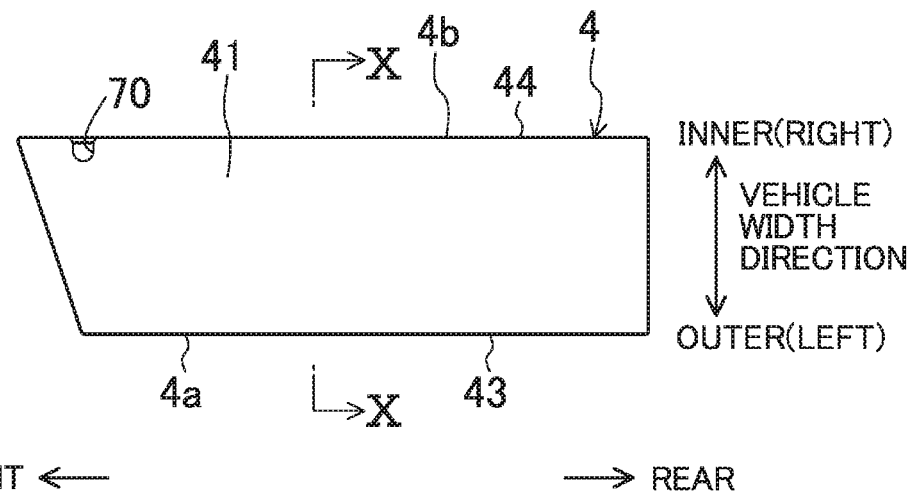
FIG. 8 is a plan view of the left crush can.
Figure 9:
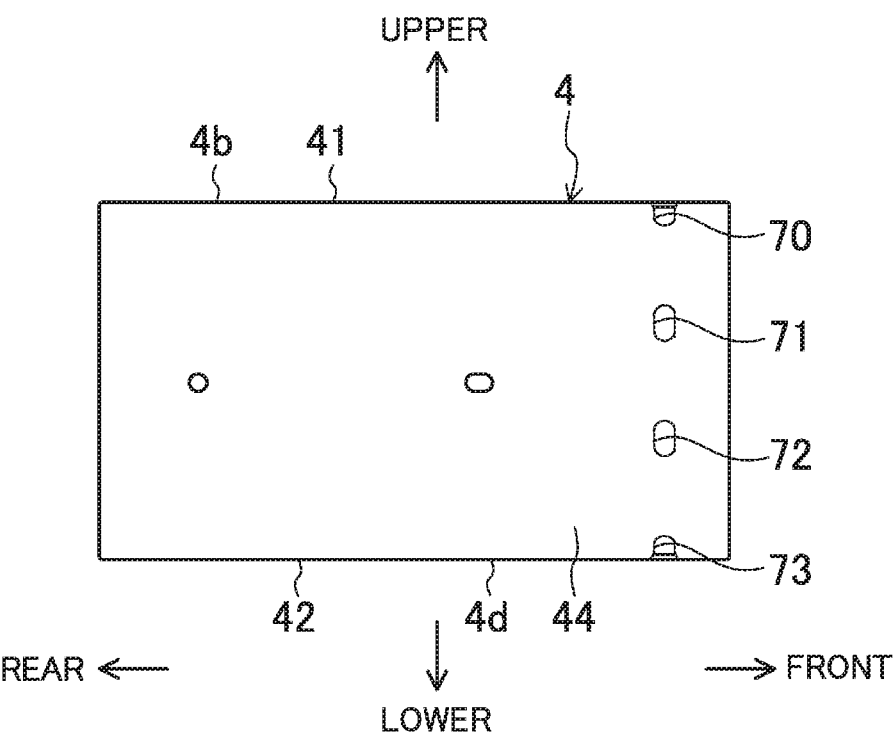
FIG. 9 is a right side view of the left crush can.

On the other hand, as illustrated in FIG. 7 and FIG. 8, the front edges of the upper wall part 41 and the lower wall part 42 of the left crush can 4 extend in the right and left direction while being inclined with a predetermined inclination angle with respect to the right and left direction so as to be located rearward toward the left side. In this way, since the front edge of the outer wall part 43 of the left crush can 4 is located behind the front edge of the inner wall part 44, the inner side of the left crush can 4 in the vehicle width direction has a shape extending forward relative to the outer side. The front end portion of the left crush can 4 is shaped to conform to a shape of the bumper beam 6 to be described later. Furthermore, the front edges of the upper wall part 41 and the lower wall part 42 of the left crush can 4 may curve and extend so as to be located rearward toward the left side. Furthermore, the front edges of the outer wall part 43 and the inner wall part 44 of the left crush can 4 extend in the vertical direction.

Figure 10:
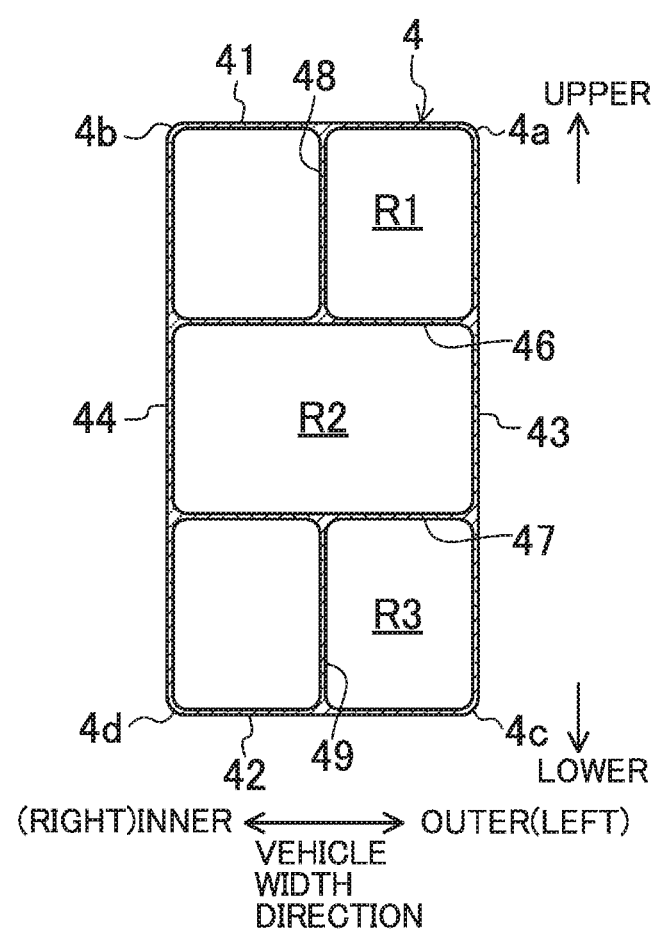
FIG. 10 is a cross-section taken along line X-X in FIG. 8.
Figure 11:
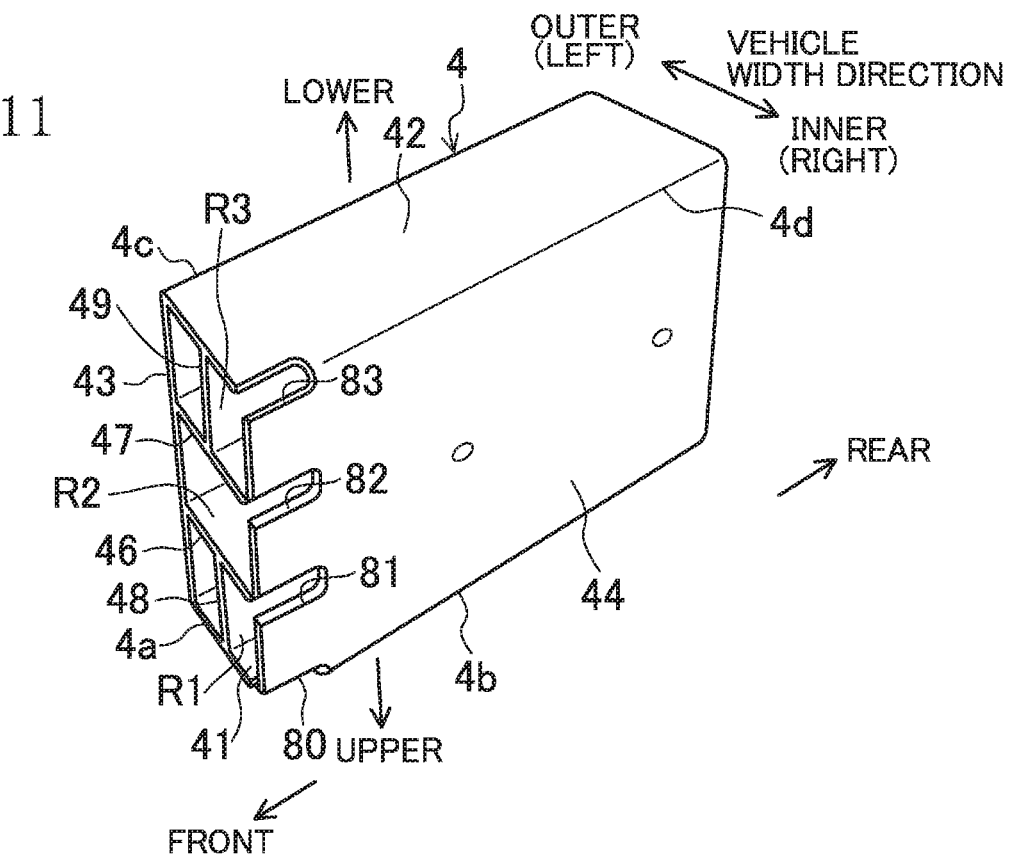
FIG. 11 is a view corresponding to FIG. 6 according to a modification example of the embodiment.
Figure 12:
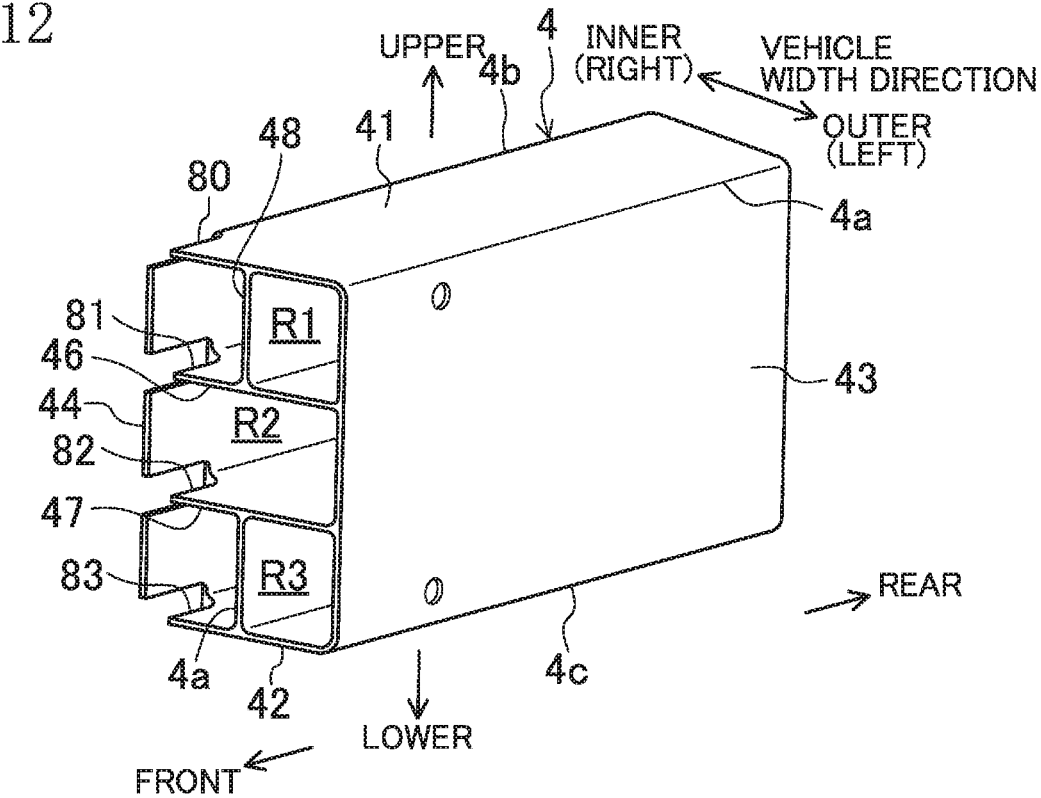
FIG. 12 is a view corresponding to FIG. 7 according to the modification example of the embodiment.
Figure 13:
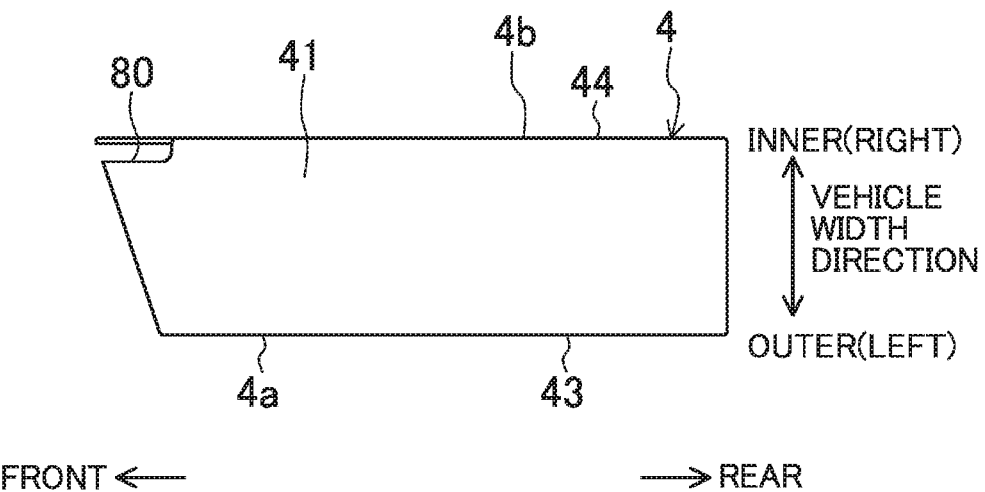
FIG. 13 is a view corresponding to FIG. 8 according to the modification example of the embodiment.
Figure 14:
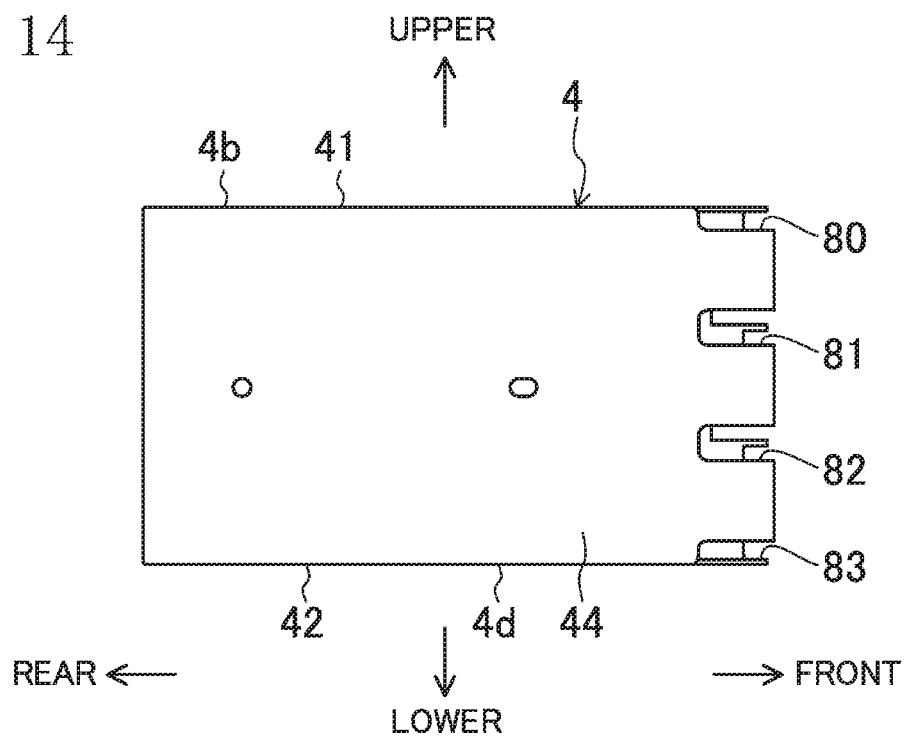
FIG. 14 is a view corresponding to FIG. 9 according to the modification example of the embodiment.

As illustrated in FIG. 7 and FIG. 10, the left crush can 4 is provided therein with the upper horizontal wall part 46 and the lower horizontal wall part 47 extending from the inner wall part 44 to the outer wall part 44 and spaced apart from each other in the vertical direction, an upper vertical wall part 48 extending from the upper wall part 41 to the upper horizontal wall part 46 in the vertical direction, and a lower vertical wall part 49 extending from the lower wall part 42 to the lower horizontal wall part 47 in the vertical direction. That is, the upper horizontal wall part 46 extends in the right and left direction from a part, above the vertical center, of the inner wall part 44 to a part, above the vertical center, of the outer wall part 44, and extends from the front end portion to the rear end portion of the left crush can 4 approximately in parallel to the upper wall part 41. The lower horizontal wall part 47 extends in the right and left direction from a part, below the vertical center, of the inner wall part 44 to a part, below the vertical center, of the outer wall part 44, and extends from the front end portion to the rear end portion of the left crush can 4 approximately in parallel to the lower wall part 42. By the upper horizontal wall part 46 and the lower horizontal wall part 47, the inside of the left crush can 4 is divided into three spaces in the vertical direction, that is, an upper space R1, a center space R2, and a lower space R3. In the embodiment, the dimensions of the upper space R1, the center space R2, and the lower space R3 in the vertical direction are set to be approximately equal to one another.

The heights of the upper horizontal wall part 46 and the lower horizontal wall part 47 are set approximately equal to those of the outer recessed linear portion 23a and the inner recessed linear portion 24a of the left front side frame 2. Specifically, the height of the upper horizontal wall part 46 is set to approximately the same heights as the upper portion 23b constituting the outer recessed linear portion 23a and the upper portion 24b constituting the inner recessed linear portion 24a. The height of the lower horizontal wall part 47 is set to approximately the same heights as the lower portion 23c constituting the outer recessed linear portion 23a and the lower portion 24c constituting the inner recessed linear portion 24a.

The upper vertical wall part 48 extends in the vertical direction from the center of the upper wall part 41 in the right and left direction to the center of the upper horizontal wall part 46 in the right and left direction, and extends from the front end portion to the rear end portion of the left crush can 4 approximately in parallel to both the outer and inner wall parts 43 and 44. By the upper vertical wall part 48, the upper space R1 is divided into two spaces in the right and left direction. The lower vertical wall part 49 extends in the vertical direction from the center of the lower wall part 42 in the right and left direction to the center of the lower horizontal wall part 47 in the right and left direction, and extends from the front end portion to the rear end portion of the left crush can 4 approximately in parallel to both the outer and inner wall parts 43 and 44. By the lower vertical wall part 49, the lower space R3 is divided into two spaces in the right and left direction.

The upper wall part 41 and the lower wall part 42 have approximate the same thickness, and the outer wall part 43 and the inner wall part 44 also have approximate the same thickness. Moreover, the upper horizontal wall part 46 and the lower horizontal wall part 47 have approximate the same thickness, and the upper vertical wall part 48 and the lower vertical wall part 49 also have approximate the same thickness.

The left crush can 4 is provided with cutout portions 70 to 73 for inducing crushing when a compressive load acts in the right and left direction. The cutout portions 70 to 73 are for positively crushing and deforming the front end portion of the left crush can 4, and specifically, the cutout portions 70 to 73 are provided spaced apart from one another in the vertical direction on the inner side of the left crush can 4 in the vehicle width direction and at the front part of the left crush can 4, and serve as through holes formed by cutting off a part of a material. The cutout portions 70 to 73 are located rearward away from the front end portion of the inner wall part 44. The upper and lower two cutout portions 70 and 73 are formed in the ridge line portions 4a and 4c, respectively. The intermediate two cutout portions 71 and 72 are respectively formed in a portion of the inner wall part 44 where the upper horizontal wall part 46 is continuous and a portion of the inner wall part 44 where the lower horizontal wall part 47 is continuous. Furthermore, the intermediate two cutout portions 71 and 72 are provided continuously to the right end portions of the upper horizontal wall part 46 and the lower horizontal wall part 47, respectively. On the other hand, the outer wall part 43 of the left crush can 4 is provided with no cutout portions.

According to a method for forming the cutout portions 70 to 73, an extrusion molding member is first obtained, and then is subjected to, for example, cutting, drilling and the like, so that the cutout portions 70 to 73 having desired shapes are obtained. The number of the cutout portions 70 to 73 is not limited to four and may be three or less or five or more. Furthermore, among the cutout portions 70 to 73, the intermediate two cutout portions 71 and 72 may be omitted or the upper and lower two cutout portions 70 and 73 may be omitted. Furthermore, any given cutout portions of the cutout portions 70 to 73 may have a notch shape. Preferably, the cutout portions 70 to 73 have a shape that is long in the vertical direction.

Since the cutout portions 70 to 73 are formed by cutting off a part of the material constituting the left crush can 4, the weight of the left crush can 4 can be reduced by that amount.

Furthermore, the upper horizontal wall part 46, the lower horizontal wall part 47, the upper vertical wall part 48, and the lower vertical wall part 49 of the left crush can 4 may be omitted.

(Configuration of Bumper Beam)

As illustrated in FIG. 1, the bumper beam 6 has an upper plate part 61 and a lower plate part 62 extending in the right and left direction while being separated from each other in the vertical direction, a front plate part 63 extending in the vertical direction to connect the front end portions of the upper plate part 61 and the lower plate part 62 to each other, and a rear plate part 64 extending in the vertical direction to connect the rear end portions of the upper plate part 61 and the lower plate part 62 to each other, and has an approximately rectangular cross-section as a whole. The dimensions of the front plate part 63 and the rear plate part 64 in the vertical direction are set to larger than those of the upper plate part 61 and the lower plate part 62 in the right and left direction.

Figure 2:
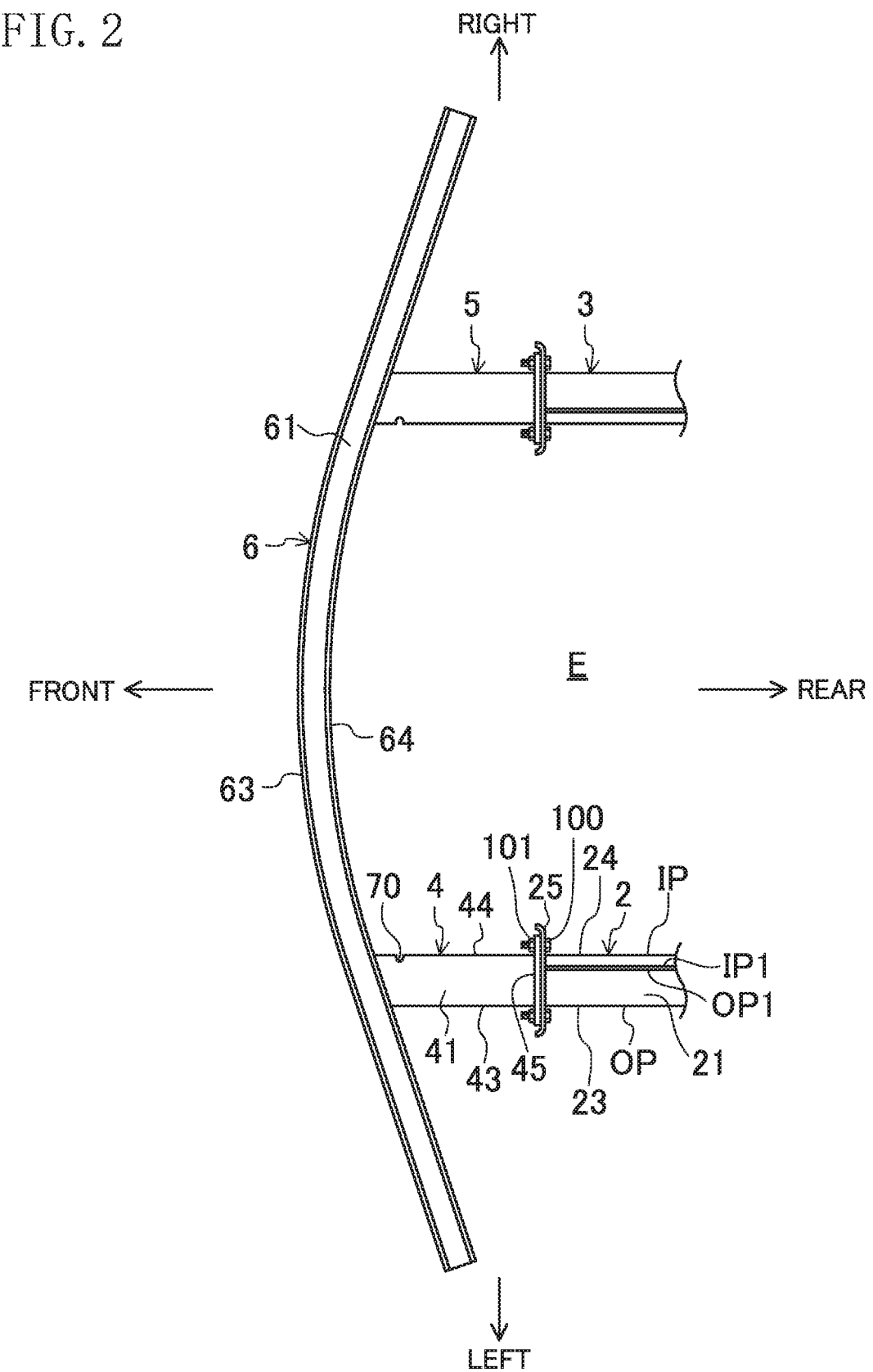
FIG. 2 is a plan view illustrating a front part of the impact absorption structure for the vehicle.

Similar to the crush cans 4 and 5, the bumper beam 6 can also be formed into an extrusion molding member; however, the present disclosure is not limited thereto and the bumper beam 6 may be configured with a press-molded plate material. The bumper beam 6 is formed to curve as a whole in the plan view as illustrated in FIG. 2 and has a shape in which both sides of the bumper beam 6 in the vehicle width direction are located closer to the rear side as getting closer to the outer sides in the vehicle width direction, that is, the bumper beam 6 has a shape in which the center in the vehicle width direction is located at the frontmost position. Such a shape of the bumper beam 6 is decided from a relation of vehicle design. Furthermore, the bumper beam 6 may have an inclined shape in the plan view, such that it is located on the rear side toward the outer side in the vehicle width direction.

As illustrated in FIG. 1, the bumper beam 6 is provided therein with an upper horizontal plate portion 66 and a lower horizontal plate portion 67 extending from the front plate part 63 to the rear plate part 64 and spaced apart from each other in the vertical direction. The upper horizontal plate portion 66 extends in front and rear direction from a part above the vertical center, of the front plate part 63, to a part, above the vertical center, of rear plate part 64. The upper horizontal plate portion 66 extends from the left end portion to the right end portion of the bumper beam 6 approximately in parallel to the upper plate part 61. The lower horizontal plate portion 67 extends in the front and rear direction from a part below the vertical center, of the front plate part 63, to a part, below the vertical center, of the rear plate part 64. The lower horizontal plate portion 67 extends from the left end portion to the right end portion of the bumper beam 6 approximately in parallel to the lower plate part 62.

By the upper horizontal plate portion 66 and the lower horizontal plate portion 67, the inside of the bumper beam 6 is divided into three spaces in the vertical direction, that is, an upper space S1, a center space S2, and a lower space S3. In the embodiment, the dimensions of the upper space S1, the center space S2, and the lower space S3 in the vertical direction are set approximately equal to one another. The heights of the upper horizontal plate portion 66 and the lower horizontal plate portion 67 approximately coincide with those of the upper horizontal wall part 46 and the lower horizontal wall part 47 of the left crush can 4, respectively.

Furthermore, the thicknesses of the front plate part 63 and the rear plate part 64 are approximately equal to each other, and are set thicker than those of the upper plate part 61, the lower plate part 62, the upper horizontal plate portion 66, and the lower horizontal plate portion 67. The thicknesses of the upper plate part 61, the lower plate part 62, the upper horizontal plate portion 66, and the lower horizontal plate portion 67 are approximately equal to one another.

(Advantages of Embodiment)

Next, the advantages of the impact absorption structure 1 of the vehicle configured as above will be described. A description will be provided for a case where an impact load of a predetermined degree or less is applied from the front such as when the vehicle collides head on at a low vehicle speed (for example, 15 km/h or less) (light collision). The impact load from the front is applied to the bumper beam 6 via a front bumper and the like (not illustrated), and compressive force acts from the bumper beam 6 to the left crush can 4 and the right crush can 5. Depending on the collision situation, there are a case where the compressive force acts only on the left crush can 4 and a case where the compressive force acts only on the right crush can 5.

Since the left crush can 4 and the right crush can 5 are attached to the left front side frame 2 and the right front side frame 3, they receive the compressive force between the bumper beam 6 and the left front side frame 2 and between the bumper beam 6 and the right front side frame 3, respectively. In such a case, the ridge line portions 2a and 2b are formed at the upper portion of the front end portion of the left front side frame 2, the ridge line portions 2c and 2d are formed at the lower portion thereof, and two portions having a strength higher than that of a flat plate portion are present at the upper portion and the lower portion of the front end portion of the left front side frame 2, respectively, so that the strength of the upper portion and the lower portion of the front end portion of the left front side frame 2 is increased.

On the other hand, similar to the front end portion of the left front side frame 2, since the ridge line portions 4a to 4d are formed at the upper portion and the lower portion of the left crush can 4, the strength of the upper portion and the lower portion of the left crush can 4 is increased. Moreover, the strength of the upper portion of the left crush can 4 is further increased by the upper horizontal wall part 46 and the upper vertical wall part 48, and the strength of the lower portion of the left crush can 4 is also further increased by the lower horizontal wall part 47 and the lower vertical wall part 49.

Furthermore, the front end portions of the plate parts 21 to 24 of the left front side frame 2 and the rear end portions of the wall parts 41 to 44 of the left crush can 4 overlap each other, thereby obtaining a positional relation in which a high-strength portion of the upper portion of the left front side frame 2 and a high-strength portion of the upper portion of the left crush can 4 correspond to each other and a positional relation in which a high-strength portion of the lower portion of the left front side frame 2 and a high-strength portion of the lower portion of the left crush can 4 correspond to each other.

In this way, when an impact load is applied to the left crush can 4 via the bumper beam 6, since the rear end portion of the left crush can 4 can be firmly and stably supported at the front end portion of the left front side frame 2, and the left crush can 4 is prevented from being displaced in an unexpected direction, so that the left crush can 4 is crushed and deformed between the bumper beam 6 and the left front side frame 2 to exhibit expected energy absorption performance. The same is also true to the right crush can 5.

When the left crush can 4 is crushed and deformed, since the cutout portions 70 to 73 are formed at the front part of the inner side of the left crush can 4 in the vehicle width direction, the right front portion of the left crush can 4 begins to be crushed and deformed and then the other portions begin to be crushed and deformed. In this way, it is possible to absorb energy by using the entire left crush can 4.

Furthermore, for example, when a collision load is applied to the intermediate portion of the bumper beam 6 in the vehicle width direction, since the inner side of the left crush can 4 in the vehicle width direction extends forward relative to the outer side of the left crush can 4, the load is applied to the inner side of the left crush can 4 earlier than the outer side at the initial stage of the deformation beginning. When the load is applied, since the inner side of the left crush can 4 is provided with the cutout portions 70 to 73 and is weakened due to the removal of a part of the material, the inner side of the left crush can 4 is easily deformed and thus the deformation of the inner side of the left crush can 4 is induced as desired.

Such features keep a large load from being transmitted to the inner side of the left front side frame 2 in the vehicle width direction, reducing the deformation of the inner side of the left front side frame 2 in the vehicle width direction. Furthermore, since a part of the material of the inner side of the left crush can 4 is removed, the weight of the left crush can 4 can be reduced by that amount and the dimension of the left crush can 4 in the front and rear direction after the deformation is particularly decreased inward in the vehicle width direction, so that impact absorption performance is improved. The same is true to the right crush can 5.

As a consequence, the deformation of the left front side frame 2 and the right front side frame 3 at the time of a light collision is reduced.

Other Embodiments

The aforementioned embodiment is only a simple example in all respects and it should be noted that it is not construed in a manner limited by the example. Moreover, all modifications and changes belonging to equivalents of the claims are considered to fall within the scope of the present invention.

As in a modification example illustrated in FIG. 11 to FIG. 14, cutout portions 80 to 83 may be notches formed by cutting off a predetermined area of the front end portion of the inner wall part 44 of the left crush can 4 toward the rear. The upper and lower two cutout portions 80 and 83 are formed in the ridge line portions 4a and 4c, respectively. The intermediate two cutout portions 81 and 82 are provided by continuous cutting to the right end portions of the upper horizontal wall part 46 and the lower horizontal wall part 47, respectively.

The aforementioned embodiment has described a case where the left front side frame 2 and the right front side frame 3 are configured with a press-molded plate material; however, the present disclosure is not limited thereto and the left front side frame 2 and the right front side frame 3 may be configured with an extrusion molding member.

INDUSTRIAL APPLICABILITY

As described above, the impact absorption structure for the vehicle according to the present invention, for example, can be provided at the front part of a passenger vehicle.

DESCRIPTION OF REFERENCE CHARACTERS

1 Impact absorption structure for Vehicle
2, 3 Front Side Frame
4, 5 Crush Can
4a, 4b, 4c, 4d Ridge Line Portion
6 Bumper Beam
41 Upper Wall Part
42 Lower Wall Part
43 Outer Wall Part
44 Inner Wall Part
46 Upper Horizontal Wall part
47 Lower Horizontal Wall part
70 to 73 Cutout Portion
80 to 83 Cutout Portion

The invention claimed is:

1. An impact absorption structure for a vehicle in which right and left crush cans are respectively attached to vehicle front end portions of front side frames each disposed on one of a right side and a left side of the vehicle and extending in a vehicle front and rear direction, and a bumper beam is attached to vehicle front end portions of the right and left crush cans to extend in a vehicle width direction, wherein
 the bumper beam is formed to be curved or inclined to be positioned in a plan view closer to a rear of the vehicle as the bumper beam extends outward in the vehicle width direction, and portions of the bumper beam curved or inclined are attached to the vehicle front end portions of the crush cans, and
 an inner side of each of the crush cans in the vehicle width direction is formed with a cutout portion by cutting off a part of a material of the crush can,
 the crush can is provided therein with a horizontal wall part extending from the inner wall part to the outer wall part, and
 the cutout portion is formed in a portion of the inner wall part where the horizontal wall part is continuous.

2. An impact absorption structure for a vehicle in which right and left crush cans are respectively attached to vehicle front end portions of front side frames each disposed on one of a right side and a left side of the vehicle and extending in a vehicle front and rear direction, and a bumper beam is attached to vehicle front end portions of the right and left crush cans to extend in a vehicle width direction, wherein
 the bumper beam is formed to be curved or inclined to be positioned in a plan view closer to a rear of the vehicle as the bumper beam extends outward in the vehicle width direction, and portions of the bumper beam curved or inclined are attached to the vehicle front end portions of the crush cans, and an inner side of each of the crush cans in the vehicle width direction is formed with a cutout portion by cutting off a part of a material of the crush can, the crush can is provided therein with a horizontal wall part extending from the inner wall part to the outer wall part, and the cutout portion is formed in a portion of the inner wall part where the horizontal wall part is continuous, and the cutout portion is provided continuously to an inner end portion of the horizontal wall part in the vehicle width direction.

3. The impact absorption structure for the vehicle of claim 1, wherein the crush can includes an upper wall part and a lower wall part extending in the vehicle width direction while being separated from each other in the vertical direction, the inner wall part extending in the vertical direction to connect inner end portions of the upper wall part and the lower wall part in the vehicle width direction to each other, and the outer wall part extending in the vertical direction to connect outer end portions of the upper wall part and the lower wall part in the vehicle width direction to each other, and at least one of a ridge line portion configured by the upper wall part and the inner wall part of the crush can and a ridge line portion configured by the lower wall part and the inner wall part of the crush can is provided with the cutout portion.

4. The impact absorption structure for the vehicle of claim 1, wherein the cutout portion is provided at a vehicle front part of the crush can.

\* \* \* \* \*